US008036344B2

(12) United States Patent
Frenette

(10) Patent No.: US 8,036,344 B2
(45) Date of Patent: Oct. 11, 2011

(54) ALARM SYSTEM PROVIDING MULTIPLE NETWORK ROUTING, INTERFACE MODULE AND METHOD

(75) Inventor: Stephan Frenette, St. Pat (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 1096 days.

(21) Appl. No.: 11/728,478

(22) Filed: Mar. 26, 2007

(65) Prior Publication Data

US 2008/0240372 A1    Oct. 2, 2008

(51) Int. Cl.
*H04M 11/00* (2006.01)

(52) U.S. Cl. .................. 379/52; 455/404.1

(58) Field of Classification Search ............ 379/45, 379/221.01; 455/404.1, 411
See application file for complete search history.

(56) References Cited

U.S. PATENT DOCUMENTS

| | | | |
|---|---|---|---|
| 5,323,461 A * | 6/1994 | Rosenbaum et al. | .... 379/399.01 |
| 5,485,142 A | 1/1996 | Stute et al. | |
| 5,745,849 A * | 4/1998 | Britton | ........ 455/404.1 |
| 6,215,404 B1 | 4/2001 | Morales | |
| 6,249,225 B1 | 6/2001 | Wang | |
| 6,643,355 B1 * | 11/2003 | Tsumpes | ........... 379/45 |
| 7,313,231 B2 * | 12/2007 | Reid | ......... 379/221.01 |
| 7,388,854 B2 * | 6/2008 | Lee et al. | ........ 370/338 |
| 7,542,721 B1 * | 6/2009 | Bonner et al. | .......... 455/404.1 |
| 7,561,671 B2 * | 7/2009 | Morris | .............. 379/37 |
| 2004/0086093 A1 | 5/2004 | Schranz | |
| 2004/0121813 A1 * | 6/2004 | Colson et al. | ............ 455/411 |
| 2004/0218748 A1 * | 11/2004 | Fisher | ........ 379/221.01 |

\* cited by examiner

*Primary Examiner* — Curtis Kuntz
*Assistant Examiner* — Maria El-Zoobi
(74) *Attorney, Agent, or Firm* — Smart & Biggar

(57) ABSTRACT

In an alarm system, outgoing calls representing a sensed alarm condition are routed to one of several communications networks. The calls are routed by first initiating a telephone call to a defined number, in response to sensing the alarm condition, and then selecting one of plurality a plurality of available networks based on called number information. A communication over the chosen network is placed to signal the alarm condition. Routing may be performed at an interface module in communication with a conventional alarm panel.

17 Claims, 4 Drawing Sheets

| | Phone No. | Network | Data Format | Network No. |
|---|---|---|---|---|
| | 416-555-1313 | GPRS | | 201.201.201.201 |
| | 416-555-1818 | GSM | S1A | 416-5518888 |
| 52A | | | | |
| | Default | GSM | | |
| | ⋮ | ⋮ | ⋮ | ⋮ |

ALARM SYSTEM PROVIDING MULTIPLE NETWORK ROUTING, INTERFACE MODULE AND METHOD

FIELD OF THE INVENTION

The present invention relates generally to alarm systems, and more particularly to monitoring of alarm systems and monitored systems, by way of one or more communications networks.

BACKGROUND OF THE INVENTION

Home and business alarms have become commonplace. Such alarms (often referred to as "security systems" or "alarm systems") typically include several sensors used to monitor unauthorized entry and other conditions at monitored premises, such as fire, smoke, toxic gases, high/low temperature (e.g. freezing) or flooding, at a premises. In response to sensing an alarm condition, a sensor provides a signal to an alarm panel that in turn may sound and notify the occurrence of the alarm to occupants of the premises and remotely signal a monitoring station or other third party.

Typically the occurrence of an alarm is signalled to a remote monitoring station that may then dispatch capable authorities to intervene at the premises. For example, in the case of sensing an unauthorized entry to the premises, the monitoring station may dispatch security personnel, typically in the form of private security guards or police officers. Such communication between the premises and the monitoring station has typically taken place by way of the public switched telephone network (PSTN).

With the desire for greater security and the advent of other communication networks more modern alarm systems utilize such other networks either in addition to or in place of the PSTN. In particular, the use of wireless (cellular) networks has become fashionable in the event that the connection to the PSTN is severed or is otherwise unavailable.

Conveniently, as the alarm system acts as a connection point to the PSTN for the entire premises, the cellular networks may act as a back-up, not only for alarm system calls, but also for conventional outgoing PSTN calls placed from the premises. That is, in the event of failure of the PSTN, conventional voice calls may be bridged to the wireless network through the alarm system.

Unfortunately, use of wireless networks is costly. Moreover, cellular network operators often levy charges in dependence on whether a data or voice call is placed using the cellular network.

Accordingly there is a need for alarm systems, network interfaces and methods that may make cost-efficient use of such networks.

SUMMARY OF THE INVENTION

Exemplary of an embodiment of the present invention, outgoing calls representing a sensed alarm condition are routed to one of several communications networks. The calls are routed by first initiating a telephone call to a defined number, in response to sensing the alarm condition, and then selecting one of a plurality of available networks based on called number information. A communication over the chosen network is placed to signal the alarm condition. Routing may be performed at an interface module, in communication with a conventional alarm panel.

In accordance with an aspect of the present invention, there is provided in an alarm system, a method comprising: sensing an alarm; initiating a telephone call to a defined number, in response to sensing the alarm; receiving called number information for the call; selecting one of a plurality of available networks, based on the called number information; placing a communication over the one of the plurality of available networks, to signal alarm.

In accordance with another aspect of the present invention, there is provided, in an alarm system, a method comprising: receiving signals signifying an outgoing call; selecting one of a plurality of available networks, based on called number information in the signals; placing a communication over the one of a plurality of available networks as selected, to route the call.

In accordance with yet another aspect of the present invention, there is provided a network interface module, comprising: a line interface for receiving communications to initiate outgoing calls; a plurality of communication network interfaces, each in communication with a communication network; a selector to select connection with one of the communication network interfaces; a processor in communication with the line interface, and the selector, and operable to select connection with one of the communication network interfaces, in response to received an outgoing call at the line interface, based on called number information in the outgoing call.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
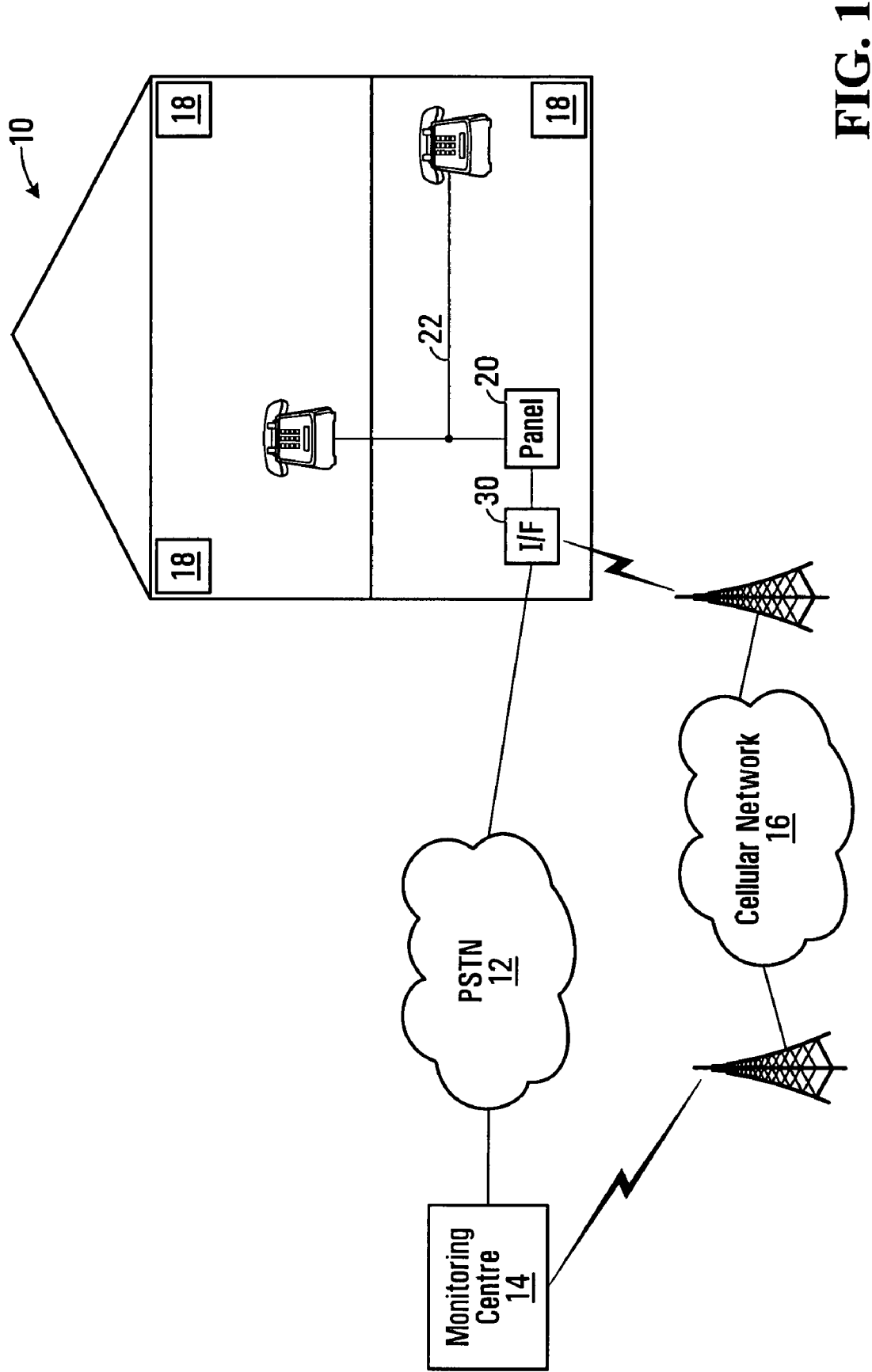
FIG. 1 is a schematic diagram of an alarm system at a monitored premises, exemplary of an embodiment of the present invention.

FIG. 1 depicts a residential or business premises 10 guarded by an alarm system including panel 20 in communication with a plurality of sensors 18. Sensors 18 may be entry sensors, flood sensors, motion detectors, smoke detectors, glass breakage sensors, or any other sensors to be monitored, as appreciated by those of ordinary skill. Sensors 18 may also include user interface sensors/panels. Sensors 18 may be in communication with panel 20, wirelessly, by a wired interconnect, through the electric wiring of premises 10, or otherwise. The alarm system may further include other interfaces such as key pads, sirens, and the like, not specifically illustrated in FIG. 1.

Panel 20 is further interconnected with the PSTN 12 and in communication with at least one other communication network 16, through a network interface module 30, exemplary of an embodiment of the present invention. In the depicted embodiment, network 16 is a cellular telephone network that carries both voice and data. Cellular network 16 may, for example, be a GPRS/GSM cellular network, and as such be considered a GSM network and GPRS network. As will become apparent, panel 20 could instead or additionally be in communication with some other network such as a wide area wireless data network, a wired data network such as the internet, or the like.

A monitoring centre 14 is in communication with PSTN 12 and cellular network 16. Monitoring centre 14 is depicted as a single monitoring centre. Monitoring centre 14 could be formed of multiple monitoring stations, each at different physical locations. For example, some monitoring stations could be in communication with network 16, others with in communication with PSTN 12. Monitoring centre 14 is associated with a plurality of PSTN telephone numbers, and optionally other network addresses that may be used to contact monitoring centre 14 to provide data indicative of a monitored event, at a monitored alarm system, such as the alarm system including panel 20.

Sensors 18 and panel 20 interact in a conventional manner. As a particular sensor 18 is tripped signifying a sensed condition, the sensor provides a signal to panel 20. Panel 20, in turn, places a network communication, typically in the form of a call, to a pre-programmed telephone number to contact monitoring centre 14, typically by way of PSTN 12.

In order to ensure that panel 20 has unfettered access to PSTN 12, the wired telephone feed 22, providing telephone signals to the remainder of premises 10, may be routed through panel 20. Feed 22 may be selectively disconnected from PSTN 12 by for example, a relay or the like, as panel 20 originates a call.

Figure 2:
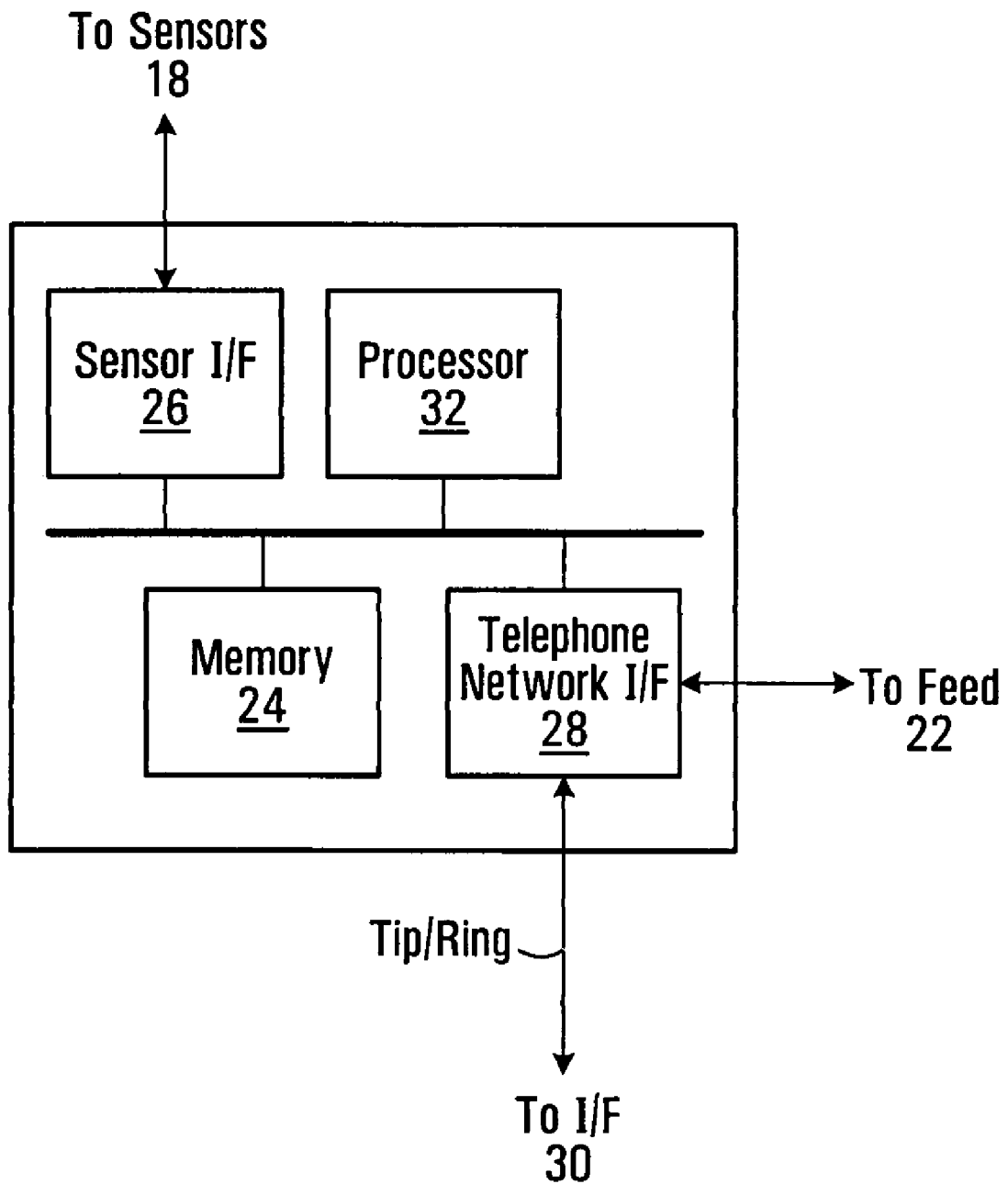
FIG. 2 is a schematic block diagram of an alarm panel of the system of FIG. 1.

An example alarm panel 20 is more particularly illustrated in FIG. 2. As illustrated, alarm panel 20 includes a central processor 32 in communication with memory 24 and a sensor interface 26. A first telephone network interface 28 is further in communication with processor 32. Network interface 28 is interconnected with telephone feed 22 for the remainder of premises 10 and provides an output at tip and ring lines of network interface 28. Tip and ring lines are typically suited for interconnection with PSTN 12. However, as will become apparent, tip and ring lines of interface 28 may feed a network interface module 30 that is in communication with several networks including PSTN 12 and cellular network 16.

Software controlling the operation of central processor 32, and hence panel 20, may be embedded in processor 32 or may be stored in memory 24 external to processor 32. This software may be conventional, and may control overall operation of panel 20, including its interaction with sensors 18 and/or a control panel, for access and control. More specifically, the software causes alarm panel 20, through interface 28 to place one or more outgoing telephone calls after detection of an alarm event. Prior to placing the outgoing call, interface 28 may disconnect telephone feed 22 from PSTN 12. Typically, the alarm event represents the tripping of one of sensors 18 when alarm panel 20 is in its armed state.

The outgoing telephone call or calls may be placed to a customer number, a monitoring centre (like monitoring centre 14), or any other alternate number by dialling a stored PSTN telephone number. The PSTN telephone number(s) to be called (e.g. the number of monitoring center 14) may be pre-programmed by an administrator of panel 20, and also stored within memory 24. Different sensed conditions may be associated with different PSTN number(s), thereby allowing different sensed conditions to be signalled to different monitoring stations, alternate numbers, or the like.

Once a pre-programmed number has been called, processor 32 generates a suitable message to the recipient. For example, in the event the number called is a subscriber number, processor 32 may generate a voice message to be heard by the subscriber. If the called numbed is a monitoring center (such as monitoring center 14), data representative of the sensed alarm may be generated, encapsulated, and passed to the monitoring centre. The data, for example, may be encapsulated using any one of a number of modulation techniques. For example, the data may be passed to the monitoring centre as a series of dual-tone, muli-frequency ("DTMF") tones using, for example, the SIA Protocol (as specified in the ANSI SIA DC-03-1990.01 Standard, the contents of which are hereby incorporated by reference), the ContactID Protocol, or as modulated data, modulated as pulses, or on a carrier frequency.

In the depicted embodiment, tip and ring lines of telephone interface 28 are interconnected to the input of a network interface module 30, exemplary of an embodiment of the present invention. Network interface module 30 is more particularly illustrated in FIG. 3. As illustrated, tip and ring lines from network interface 28 are provided to a telephone line interface 46 of module 30. A tone/pulse decoder 44 receives signals from tip and ring lines of interface 28, through telephone line interface 46. Tone/pulse decoder 44 may be formed as a digital signal processor, capable of recognizing and decoding tones/pulses expected from telephone interface 28. To this end, tone/pulse decoder 44 may include a DTMF decoder, a telephone pulse decoder, and/or a decoder for any other modulation schemes/types received from interface 28. Tone/pulse decoder 44 generates data representative of decoded pulse/tones to processor 34.

Processor 34 includes programmable storage memory that controls overall operation of interface module 30 and is in communication with tone/pulse decoder 44 to receive data representative of decoded tone/pulse signals on from interface 28. Processor 34 is further interconnected with selector 36. Selector 36 also takes its input from tip and ring lines of interface 28 (provided by way of telephone line interface 46, and DTMF decoder 44, as required) and interconnects these to one of a number of network interfaces 38*a*, 38*b* . . . (individually and collectively network interfaces 38). Each network interface 38, allows for communication over a disparate network. In the depicted embodiment selector 36 interconnects the tip and ring to one of a PSTN interface 38*a*, a GSM interface 38*b*, and a GPRS interface 38*c*, or any optional other additional network interface. Software controlling the operation of processor 34 may be embedded in processor 34 or may be stored in memory 40 external to processor 34.

GSM interface 38*b* and GPRS interface 38*a* may be formed as one or more conventional GSM/GPRS radios. The radios may be controlled by processor 34 using the known AT command set. PSTN interface 38*c* may take the form of a conventional connector to the PSTN. Alternatively, PSTN interface 38*c* could include active components or passive components, such as a filter, amplifier, isolator, or the like.

Telephone line interface 46 is interconnected with PSTN 12, and monitors the presence of a dial tone from the PSTN. In the presence of a dial tone, telephone line interface 46 acts in a pass through mode, and passes current from PSTN 12 to telephone feed 22 (as provided by selector 36 and PSTN network interface 38*c*), providing a necessary telephone loop current to telephones interconnected with feed 22. In the absence of a dial tone from PSTN 12, telephone line interface 46 produces loop current to provide to tip and ring lines of interface 28. The loop current simulates interconnection of network interface 28 to PSTN 12, when active and may drive phone equipment interconnected to feed 22. Telephone line interface 46 may also generate a traditional audible dial tone provided to network interface 28, to further simulate the PSTN.

As detailed below, software controlling operation of processor 34 controls selector 36 to selectively route calls passed through, or originating at network interface 28 to a desired network, in communication with interface module 30, through one of network interfaces 38. The desired network may be chosen based on the called number identifier In operation in the absence of an alarm and in the presence of a connection to the PSTN, interface module 30 interconnects tip and ring lines from interface 28 to the PSTN, through line interface 46 and network interface 38c. Interface 28, in turn, is interconnected with the remainder of the telephone wiring/feed 22 of premises 10. Thus, in the absence of an alarm, outgoing calls over PSTN 12 may be placed by users of telephones interconnected with telephone feed 22, in a conventional way.

In the presence of an alarm, telephone interface 28 disconnects telephone feed 22 so that panel 20 has unfettered access to the communication network. Telephone interface 28, in turn, places a conventional telephone call to a pre-programmed number, pre-programmed at panel 20 to a monitoring station, subscriber, or other alternate number or numbers also in a conventional manner. The call, however, is placed by way of interface 30, and not directly on PSTN 12.

Thus, in the absence of a working connection with PSTN 12, or when otherwise directed by processor 32, any call received at network interface module 30 may be routed through selector 36 to a selected network, in communication with a selected one of network interfaces 38. In the depicted embodiment, any time the PSTN is available, processor 32 configures selector 36 to interconnect panel 20 to PSTN interface 38c and thus to PSTN 12. As noted, signals from interface 28 are passed directly to PSTN 12. Interface 28 thus places the call to monitoring station, as it would in the absence of network interface module 30.

In the absence of access to the PSTN 12, however, processor 34 controls selector 36 to place signals on tip and ring signals of interface 28 to an alternate network. More specifically, processor 34 assesses to which of multiple available networks an outgoing communication is to be routed based on called party identification information extracted from signals presented at interface module 30, by interface 28. More specifically, decoder 44 may decode DTMF or pulse tones representing calls to be placed and provides these to processor 34. Conveniently, telephone line interface 46 generates a loop current simulating an interconnected PSTN to interface 28.

Processor 34, in turn, consults a lookup table 50, stored in memory 40 to configure selector 36 to select an available network on the basis of the called number identification information, and route the call/communication from network interface 28.

Figures 3, 4:
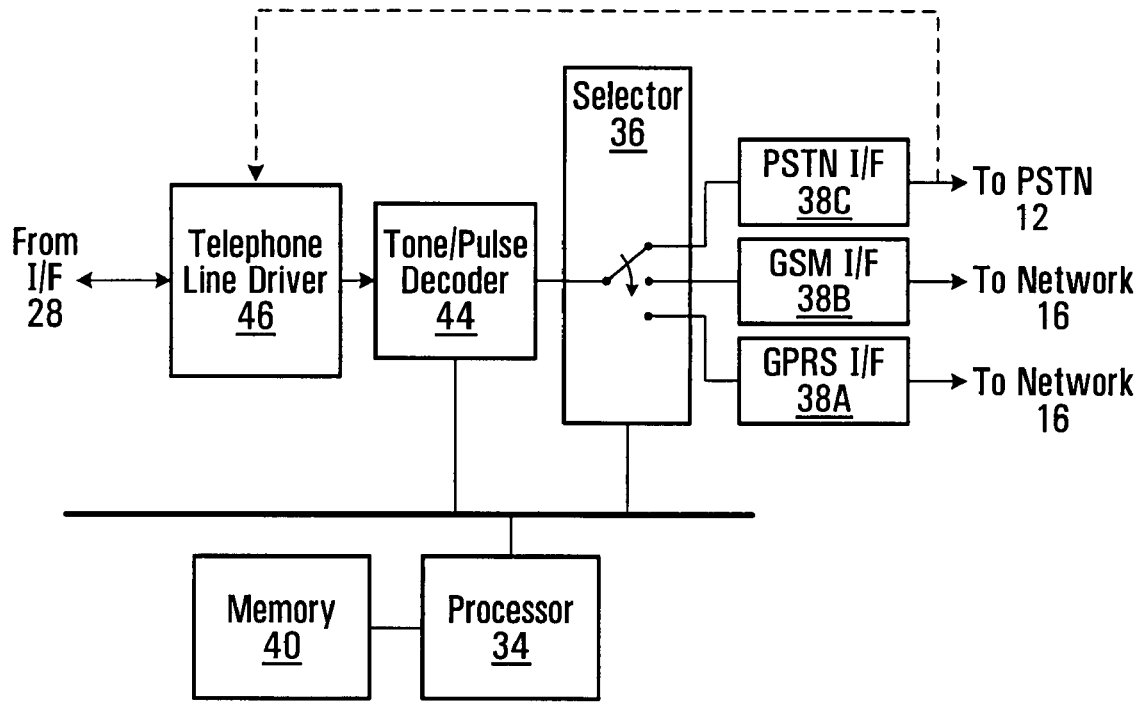
FIG. 3 is a schematic block diagram of a network interface module of the alarm system of FIG. 1, exemplary of an embodiment of the present invention.
FIG. 4 illustrates an example table, stored at the network interface module of FIG. 3.

An example lookup table 50 is depicted in FIG. 4. As illustrated, table 50 includes a plurality of called telephone numbers 52a, and corresponding network identifiers 52b, expected data formats 52c, and network addresses 52d. As will become apparent, table 50 allows interface module 30 to route a call from network interface 28 to a selected network, in communication with one of network interfaces 38.

Figure 5:
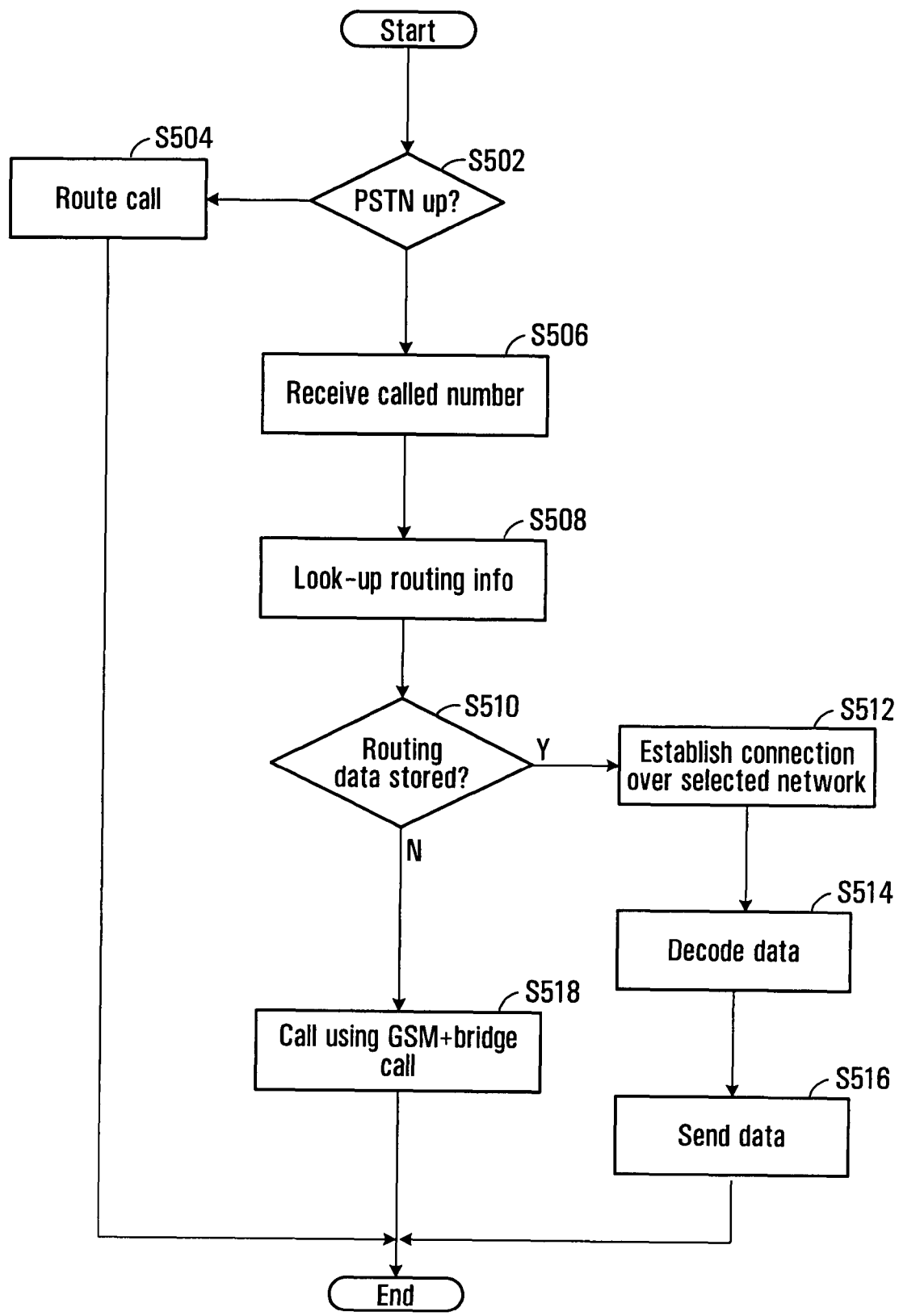
FIG. 5 is a flow chart, performed at the network interface module of FIG. 3.

Steps performed at interface module 30 in the presence of a call to be routed by interface module 30 are detailed in FIG. 5. As illustrated, in the presence of a functioning connection to PSTN 12, the outgoing calls are routed directly to the PSTN by way of interface module 30 in steps S502 and S504. In the absence of the PSTN, called number identification information is extracted from the call in step S506 by decoder 44, and provided to processor 34. Next, in step S508 the called number identification information is compared to stored called number identification information (i.e. called telephone numbers 52a) in table 50.

If the called number is found in table 50 as determined in step S510, selector 36 is configured to interconnect tip and ring lines from interface 28 to a corresponding network interface, as specified in column 52b of table 50, e.g. network interface 38a or network interface 38b, network interface 38c, etc. in step S512. A call or network connection to a corresponding destination network address specified in column 52b, as stored in table 50 is placed.

Optionally, in the event that the interconnected network does not permit a direct bridge between the output of tip and ring lines of interface 28, the respective network interface may perform translations of data placed on tip and ring lines of interface 28.

For example, after decoding called number identification information, additional DTMF tones or similarly encoded data may be decoded and encapsulated as data placed on a data network such as the GPRS network, by for example, GPRS interface 38b. This is performed in step S514. Decoding may be done with knowledge of the expected encoding protocol as stored in column 52c. Optionally, panel 20 may expect a handshake signal prior to providing additional DTMF tones, or similarly encoded data. As such, processor 34 through decoder 44 may provide the required handshake signal based on the stored data format type. For example, the SIA protocol requires/expects a DTMF tone or tone sequence from a monitoring station prior to transmitting encoded data. Interface module 30 (through, for example decoder 44) may thus provide this tone or tone sequence, so that panel 20 will provides the alarm data.

Once the connection has been established with the selected network, data/voice signals are provided to the network in step S516. In the event no routing information for the called number is found as determined in step S510, the calls are routed to a default network. In the depicted embodiment the default network may be the cellular telephone voice network as, for example, interconnected by way of GSM interface 38b. Conveniently, processor 34 may repeat the called number identification information to GSM interface 38b in step S512, thus allowing the call to be established using the conventional PSTN telephone number associated with the call. Once the connection is established, tip and ring of interface 28 may be bridged to the analog radio input of GSM interface 38b.

So for example, in the presence of an entry alarm, panel 20 may initiate a call to exemplified telephone number "416-555-1313". Processor 34, may in turn route the call through GPRS network interface 38a, at GPRS address "201.201.201.201", as specified in column 52d. As required, data contained in the call originated by panel 20 may be decoded and further encoded by processor 34, before being provided to the destination address in the GPRS network. Data may be decoded from the SIA protocol, as specified in column 52c, and encapsulated as internet protocol v4 packets, as required by the GPRS network. A GPRS connection may be made by providing the network address particulars, typically by way of AT codes, to GPRS interface 38c.

Likewise, a call to exemplified telephone number "416-555-1818" may be placed by way of GSM interface 38b to corresponding number "416-551-8888". Once a call is established over GSM interface 38b, tip and ring of interface 28 may be bridged to the analog radio input of GSM interface 38b, and the call may proceed in the same way as a call over PSTN would proceed. No translation or handshaking is required.

Conveniently, using steps S500 and interface module 30, data calls placed by panel 20, as for example placed to monitoring centre 14, may be placed by way of a data network such as the GPRS network of cellular network 16 in the absence of interconnection with PSTN 12.

Voice calls and other calls placed by subscribers at premises 10, not having associated called number data in table 50, may be placed by way of telephone or premises telephone feed 22 and may in turn be routed using a suitable default network (e.g. the GSM network). Again, the default network can be specified in table 50.

In this way calls that may be routed of data network may be so routed, to reduce costs. At the same time, voice calls may be routed over the GSM network of network 16, allowing the GSM network to serve as a backup for PSTN 12, to users at premises 10 in case PSTN 12 becomes unavailable.

Of course, as will be appreciated calls could be routed to a selected network by interface module 30, even in the presence of a working connection to PSTN 12. In this way, calls to a monitoring could be passed more efficiently over a data network, without relying on PSTN 12. Similarly, select calls (such as emergency calls) could be routed over cellular network 16.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. In an alarm system, a method comprising:
sensing an alarm at a monitored premises;
initiating a telephone call from an alarm panel to a defined number, in response to sensing said alarm;
receiving called number information for said telephone call at an interface at said premises;
determining if a primary telephone network is available;
in response to determining that said primary telephone network is not available:
selecting one of a plurality of available secondary networks, based on said called number information;
placing a communication from said interface at said premises over said one of said plurality of available networks,
wherein said called number information identifying a telephone number used to signal said alarm and stored at said interface results in a communication over a specific one of said secondary networks to signal said alarm; and
wherein said called number information identifying a telephone number that is not stored at said interface results in a communication placed over a default one of said secondary networks.

2. The method of claim 1, further comprising determining a destination address for said communication based on said called number information.

3. The method of claim 1, further comprising receiving data from said telephone call signalling said alarm, and re-encoding said data for transmission over said default one of said plurality of available secondary networks, to signal said alarm.

4. The method of claim 3, wherein said call is received from an alarm panel, and further comprising providing a handshake signal to said alarm panel to receive said data from said call.

5. The method of claim 1, wherein said plurality of secondary networks comprise a wireless voice network and a wireless data network.

6. The method of claim 1, wherein said selecting comprises comparing said called number information to stored called number information.

7. The method of claim 1, wherein said default one of said secondary networks comprises a cellular voice network.

8. The method of claim 1, wherein said called number information is encoded using DTMF codes.

9. The method of claim 1, wherein said data is received as encoded DTMF tones.

10. In an alarm system at a monitored premises, a method comprising:
trapping signals signifying an outgoing call at an interface at said monitored premises;
determining if a primary telephone network is available;
in response to determining that said primary telephone network is not available:
selecting at said interface one of a plurality of available secondary networks, based on called number information in said signals;
placing a communication from said interface at said premises over said one of said plurality of available networks, as selected
wherein said called number information identifying a telephone number stored at said interface results in a communication over a specific one of said secondary networks to signal said alarm; and
wherein said called number information identifying a telephone number that is not stored at said interface results in a communication placed over a default one of said secondary networks.

11. A network interface module comprising:
a line interface for receiving communications to initiate outgoing calls from tip and ring connections of an alarm panel;
a plurality of communication network interfaces, each in communication with a communication network;
a selector to select connection with one of said communication network interfaces;
a processor in communication with said line interface, and said selector, and operable to determine if a primary telephone network is available, and in response to determining that said primary telephone network is not available, select one of said communication network interfaces in communication with a secondary communication network, in response to received an outgoing call at said line interface, based on called number information in said outgoing call;
wherein said called number information identifying a telephone number stored at said interface results in a communication over a specific one of said secondary communication networks to signal said alarm; and
wherein said called number information identifying a telephone number that is not stored at said interface results in a communication placed over a default one of said secondary communication networks.

12. The module of claim 11, wherein said plurality of communication network interfaces include a GPRS interface, a PSTN network interface, and a GSM network interface.

13. The module of claim 11, wherein said line interface comprises a loop current generator.

14. The module of claim 11, further comprising a DTMF decode in communication with said processor to decode said called number information.

15. The module of claim. 11, further comprising memory storing called number identifiers, and corresponding networks over which associated calls with said called number identifiers should be routed.

16. The module of claim 11, wherein said processor and line interface are further operable to provide a handshake signal by way of said line interface to an interconnected alarm panel to data from said outgoing call.

17. An alarm system comprising a panel operable to generate outgoing calls in response to sensed condition, and the interface module of claim 11 connected to said panel to receive said outgoing calls.

* * * * *